United States Patent [19]
Harris

[11] 4,199,259
[45] Apr. 22, 1980

[54] DETECTOR PULSE ENHANCEMENT CIRCUIT

[75] Inventor: David E. Harris, Columbus, Ohio

[73] Assignee: Autech, Columbus, Ohio

[21] Appl. No.: 811,702

[22] Filed: Jun. 27, 1977

[51] Int. Cl.² ............................................. G01B 11/08
[52] U.S. Cl. ..................................... 356/387; 250/560
[58] Field of Search ............... 356/160, 167, 386, 387; 250/560, 563, 571

[56] References Cited

U.S. PATENT DOCUMENTS

| | | | |
|---|---|---|---|
| 3,856,412 | 12/1974 | Zanoni | 250/560 |
| 3,905,705 | 9/1975 | Petrohilos | 356/387 |
| 4,025,796 | 5/1977 | Erdmann | 250/560 |
| 4,043,673 | 8/1977 | Harris et al. | 356/386 |

Primary Examiner—John K. Corbin
Assistant Examiner—R. A. Rosenberger
Attorney, Agent, or Firm—Anthony D. Cennamo

[57] ABSTRACT

An optical gauging device wherein a laser beam is deflected to produce a bidirectional scan; a measuring portion of the split beam scans an object being inspected while the other portion scans a calibration reticle having alternating opaque and transparent bands. The alternating transmission and occultation of the beam through the reticle is used to generate calibration pulses, each representing a predetermined increment of movement of the calibration beam. The measuring portion of the beam is converted into parallel light beams which in turn are occulted by the workpiece being measured. A series of high and low square wave pulses are generated that are operative to start and stop the count of the calibration pulses. The count of the calibration pulses is directly related to the dimension of the workpiece being measured. A detector pulse enhancement circuit converts the measured signals to an accurate set of timing pulses independent of scan velocity, part size, part composition and interfering noise. The pulse generation utilizes a variable gain amplifier to provide a one-to-one output except upon the detection of a measuring signal.

7 Claims, 3 Drawing Figures

DETECTOR PULSE ENHANCEMENT CIRCUIT

PRIOR ART AND BACKGROUND

An optical measuring system utilizing light from a laser beam is disclosed in the co-pending application, Ser. No. 566,413, now U.S. Pat. No. 4,043,673 for "Reticle Calibrated Diameter Gauge", by David E. Harris, et al., and assigned to the same assignee. In that co-pending system the occultation of the measuring beam by the workpiece being measured generates signals that are converted to a series of timing pulses operative to control the counting of the calibration pulses. The number of pulses counted, directly related to the dimension of the workpiece being measured is converted to digital signals and so displayed.

It has been found in practice that the measured signal, representative of the workpiece dimension, is affected by the scan velocity, part size, part composition, foreign matter and other forms of noise. Accordingly, the prior art systems, particularly when utilized in certain industrial environments produce measurements that are subjected to error.

Also, there are innumberable pulse forming and pulse shaping circuits known to the prior art; certain of these are intended to generate a series of pulses from a high noise system. A typical example of the prior art pulse forming circuits may be in ignition firing systems. The most reliable of these ignition pulse forming circuits are the one-short multivibrator or blocking oscillator type. But again, the application of the circuits of the prior art is quite distinctive from that of calibration circuits wherein accuracy is most critical.

SUMMARY OF INVENTION

The present invention is for a pulse enhancement circuit utilized in an industrial process with an on line product measurement. The measuring systems in many aspects comprise a continuous and repetitive series or train of pulses that are counted in a counter. A start signal and a stop signal, representative by their spacing of the product dimension, determines the number of the continuous pulses to be counted.

The start/stop pulse signal generated in the circuit of the present invention overcomes the attendant disadvantages of the prior art as set forth above. This circuit utilizes a variable gain amplifier having a unity, i.e. one-to-one gain except upon receipt of a signal having a larger amplitude. In that instance the larger the amplitude of the incoming signal the larger the gain of the amplifier. In this respect the entire measured signal is reshaped, integrated and rectified prior to its application to the amplifier. Upon receipt of the high/low signal, caused by the object in the path of the measuring beam, the gain of the amplifier is reflected is an enhanced pulse output.

OBJECTS

It is accordingly a principal object of the present invention to provide in a laser beam optical measuring system for thickness measurement a new and improved electronic measuring circuit capable of providing a train of timeing pulses truly indicative of the dimension of the workpiece.

It is a further object to provide a pulse forming circuit in such an optical measuring system that is capable of high resolution, stability, and independent of scan velocity, part size, part composition, and interfering noise.

Other objects and features of the present invention will become apparent from the following detailed description when taken in conjunction with the drawings, in which:

DETAILED DESCRIPTION OF INVENTION

Figure 1:
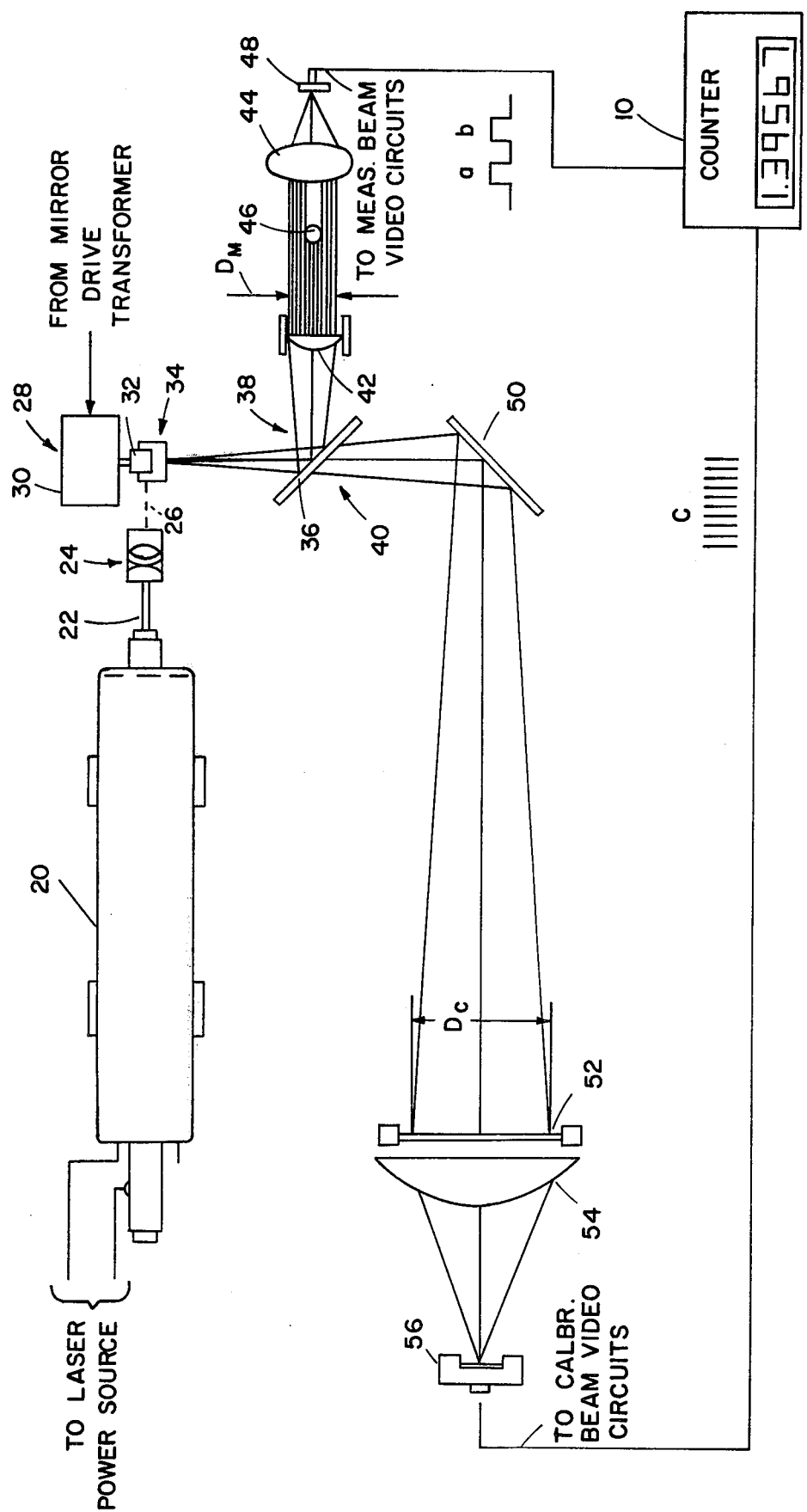
FIG. 1 illustrates basically an optical measuring system havng calibration and measuring scans.

With particular reference to FIG. 1, there is shown the essential features of an optical gauging system wherein the circuit of the present invention is utilized. A laser 20, excited by a suitable power source produces a light beam 22. The laser may be of any desired type, such as a 2ms. Heilum-Neon device, producing a light beam of about 50 mil diameter. A reducing lens unit 24 positioned in the path of the beam produces a much smaller second beam 26, e.g., 15 mil diameter.

Positioned in the path of beam 26 is a beam scanner 28 comprised of a scan motor 30 connected by a shaft to a scan mirror 32. The scanned beam is reflected from mirror 32 onto another mirror 34 which directs the beam onto a 50% beam splitter 36 to produce a reflected beam 38 and a transmitted beam 40. Reflected beam 38 passes through a collimating lens 42 to convert this beam into a set of parallel beams having a scan width $D_m$. The resulting parallel scan is a narrow line of constant height $D_m$ independent of the position between lens 42 and a receiving lens 44. The space between lenses 42 and 44 defines the measuring region. An object 46, say a wire, the diameter of which is to be measured, is arranged to pass through the measuring region for interception by the measuring beam. For production-line use, the gauge will be positioned at some convenient location, and the wire inspected as it exits.

As shown in FIG. 1 the measuring beam impinges on lens 44 which focuses the beam onto a photo-detector 48. Since the beam is always focused on the detector, the latter is illuminated except when the beam is intercepted by wire 46. The resulting signal at the output of detector 48 is a pulse, the width of which is representative of the wire diameter or alternatively a pair of pulses a and b having a spacing representative of the wire diameter.

Referring back to beam splitter 36, the transmitted beam 40 impinges on a surface mirror 50 which beam scans back and forth the calibrating reticle 52. The beam alternately is occulted and passes through the reticle wherein it is focused by a cyclindrical lens 54 onto a calibration beam photo-detector 56. The light beam interruption pattern produced by reticle 52 results in a signal output from photo-detector 56 which serves to generate the train of pulses c.

The train of pulses c comprises the calibration pulses that are counted in the counter 10 and digitally read out as the object 46 dimension. The start and stop of the clock counting of the calibration pulses is by the measured pulses a and b.

It can be appreciated, to obtain an accurate count that is, a count truly representative of the object 46 dimension, it is essential that the start and stop pulses a and b are accurately generated.

Figure 2:
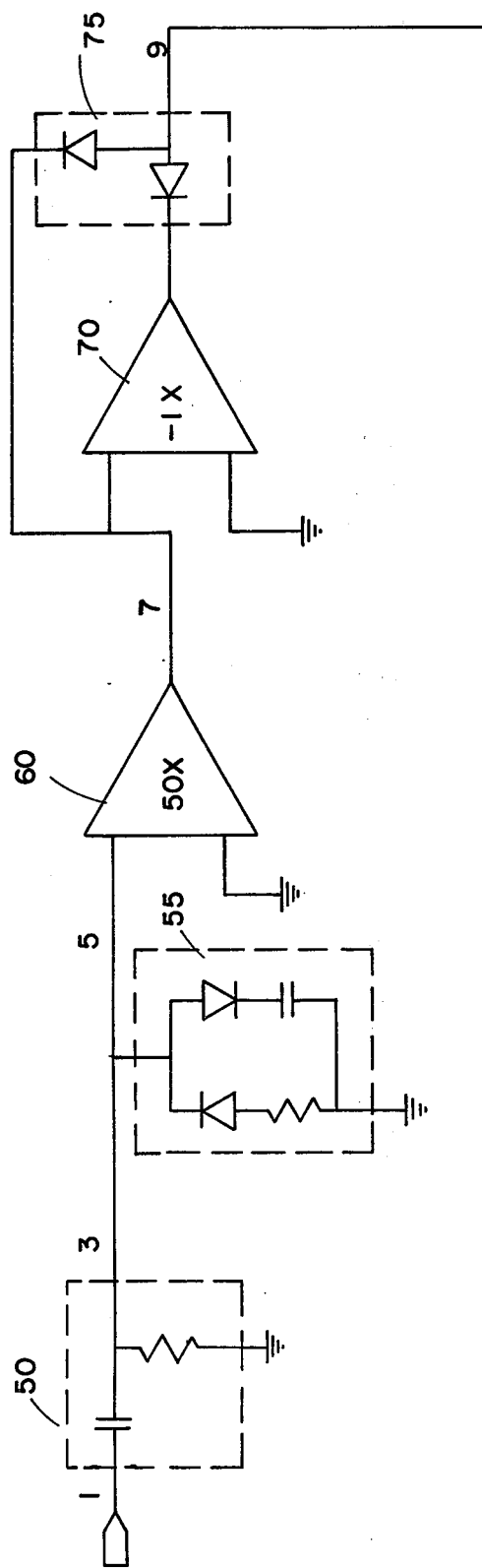
FIG. 2 illustrates schematically the pulse enhancement circuit.
Figure 2:
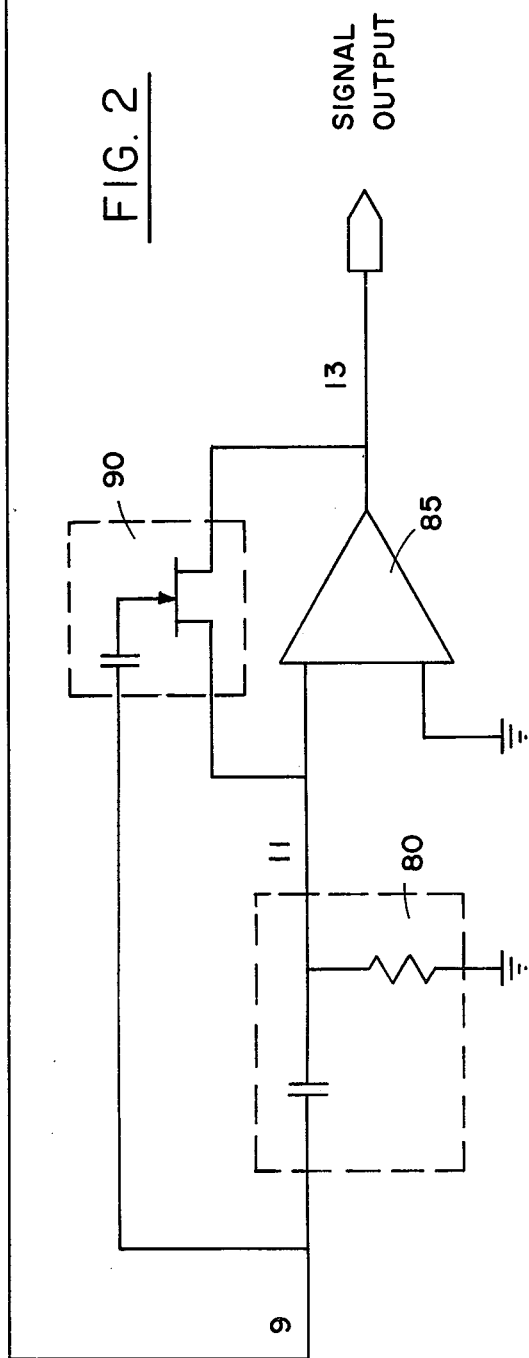

With particular reference now to FIG. 2, there is illustrated schematically the pulse enhancement circuit of the present invention. This circuit finds particular utility in an optical measuring system such as above described. In such a system, as in the disclosed aforesaid co-pending patent application and in certain other prior art systems, the beam is split into a calibration beam and a measuring beam. The calibration beam generates a series of pulses from a scanned reticle. The measuring beam occulted by the workpiece is detected and converted into a high and low pulse for each scan. In this way the spacing between, i.e. the dark area, is indicative of the dimension of the workpiece. By utilizing the first pulse to start the counting of the calibration pulses and the second pulse to stop the counting, a signal is derived that may be read-out digitally in dimensions. In view of the above, the accuracy and reliability of these measuring pulses (timing pulses) can better be appreciated.

Figure 3:
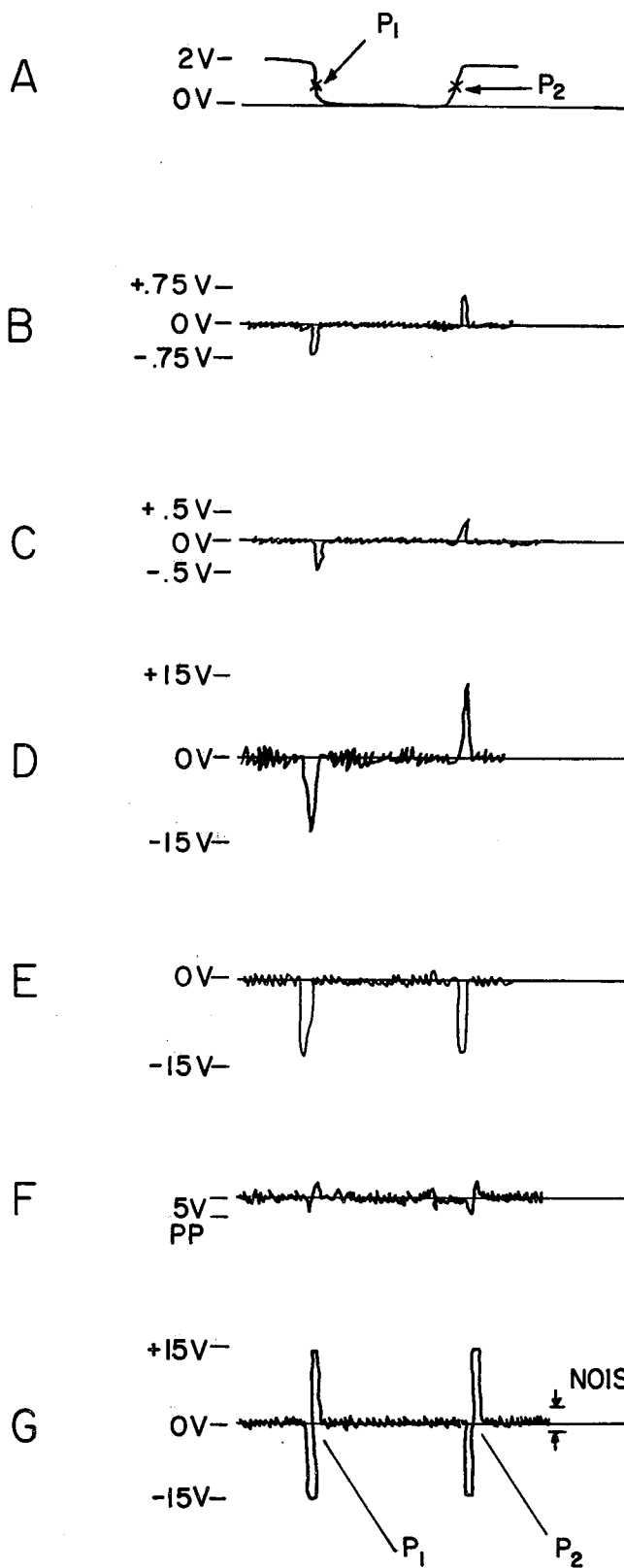
FIG. 3 shows waveforms in the measuring system of the present invention.

With particular reference to FIGS. 2 and 3, the input pulses at point 1 and depicted by waveform A, are differentiated in the capacitance/resistive network 50. The differentiated output signal at point 3 and shown in waveform B is transformed by wave shaper circuit 55 to that of the waveform C appearing at point 5 of the circuit. Waveshaper 55 is so designed that a wide range of signal amplitudes may be accepted without distortion.

Amplifier 60 amplifies the waveshaped signal at the output of the waveshaper circuit 55 to yield at its output, at point 7 an amplified signal as shown in waveform D. Amplifier 70 is operative to provide unity gain while inverting the input signal appearing at 7. The diode network 75 rectified the inverted signal to provide the rectified signal at point 9 and shown by the waveform E. This rectified signal in turn is differentiated by network 80 as shown by the waveform F.

The primary function of the integrated signal shown at F is to regulate the gain of the amplifier 85. The gain is accomplished via FET feedback circuit 90. In operation the gain of amplifier 85 is directly proportional to the amplitude of its input signal. That is, the larger the amplitude of the input signal to amplifier 85, the higher its gain.

Accordingly, at low signal conditions amplifier 85 is at a unity gain; whereas, with the appearance of the edge of a detector pulse the gain of amplifier 85 is very high. The function of amplifier 85 is to form consistant and very fast rise time pulses as shown by the exempliary waveform G. The zero crossing of waveform G occurs at the 50% pulse height of waveform A to provide a consistant, repeatable and accurate time width measurement of the detector pulse width.

Although a specific circuit arrangement is illustrated and a certain application of the circuit described, it is to be understood modification of the circuit may be had and the circuit is equally applicable to other systems requiring an accurate timing pulse.

What is claimed is:

1. In a measuring system wherein the count of a series of calibration pulses is initiated and stopped by a pulse derived from a workpiece dimension measuring signal, the improvement in the circuit for forming said start and stop pulses comprising:
   a waveshaping and rectifying circuit for converting said input signals to a substantially varying amplitude rectified signal;
   a variable gain amplifier having unity gain at low signal conditions and a high gain at higher amplitude signals;
   means for connecting said varying amplitude signal to said amplifier, said amplifier in response to said high amplitude rectified input signals representative of the dimension measured operative to produce at its output a train of timing pulses to control the count of said calibration pulses, and
   means for reading out said count as the dimension measured.

2. The measuring system of claim 1 wherein said system is an optical system, wherein said calibration pulses are reticle occulted pulses and said start and stop pulses are a workpiece occulted pulses; said pulses formed by said amplifier representative of the dimension of said workpiece.

3. The measuring system of claim 1 wherein said varying gain amplifier is an FET amplifier.

4. The measuring system of claim 1 wherein said circuit further comprises a differentiator and an inverter.

5. A circuit for converting a series of input signals to an accurate train of timing pulses comprising:
   a waveshaping and rectifying circuit for converting said pulses to a substantially varying amplitude rectified signal,
   a variable gain amplifier having unity gain at low signal conditions and a high gain at higher amplitude signals, and
   means connecting said varying amplitude signal to said amplifier, said amplifier in response to said high amplitude rectified input signals operative to produce at its output a train of timing pulses.

6. The circuit of claim 5 wherein said waveshaping and rectifying circuits further comprises a differentiator and an inverter.

7. The circuit of claim 5 wherein said varying gain amplifier is an FET amplifier.

* * * * *